US00RE34008E

United States Patent [19]

Quist et al.

[11] E Patent Number: Re. 34,008

[45] Reissued Date of Patent: Jul. 28, 1992

[54] METHOD OF PRODUCING AN ALUMINUM ALLOY PRODUCT

[75] Inventors: William E. Quist, Redmond; Michael V. Hyatt, Bellevue, both of Wash.

[73] Assignee: The Boeing Company, Seattle, Wash.

[21] Appl. No.: 75,838

[22] Filed: Jul. 20, 1987

Related U.S. Patent Documents

Reissue of:

[64] Patent No.: 4,305,763
Issued: Dec. 15, 1981
Appl. No.: 947,089
Filed: Sep. 29, 1978

[51] Int. Cl.[5] ..... C22F 1/04

[52] U.S. Cl. ..... 148/417; 148/439; 148/694; 148/552

[58] Field of Search ..... 148/12.7 A, 11.5 A, 148/2, 417, 439

[56] References Cited

U.S. PATENT DOCUMENTS 3,881,966 5/1975 Staley et al. ..... 148/12.7 A

OTHER PUBLICATIONS

Staley et al., "Further Development of Aluminum Alloy X7050, Final Report," Naval Air Systems Command Contract N00019-71-C0131, May 8, 1972 (Navy Report III).

Lin, Fu-Shiong, "Low Cicyle Corrosion Fatigue and Corrosion Fatigue Crack Propagation of High Strength 7000-Type Aluminum Alloys", Georgia Institute of Technology, May, 1978.

Starke, E. A., "Aluminum Alloys of the 70's: Scientific Solutions to Engineering Problems. An Invited Review", 29 Materials Science and Engineering 99-115 (1977).

Sanders, Jr. et al, The Effect of Intermediate Thermomechanical Treatments on the Fatigue Properties of a 7050 Aluminum Alloy, Metallurgical Transactions A, Vol. 9A, Aug. 1978, pp. 1087-1100.

"Synthesis of High-Strength Aluminum Alloys," Technical Report AFML-TR-74-129, Part 1, dated Dec. 1974, and prepared for the Air Force Materials Laboratory, Wright Patterson Air Force Base, by Battelle Columbus Laboratories and the Reynolds Metal Company.

Thompson, David S., "Metallurgical Factors Affecting High Strength Aluminum Alloy Production", Apr. 1975.

Staley, J. T., "Microstructure and Toughness of High--Strength Aluminum Alloys", *Properties Related To Fracture Toughness. ASTM STP* 605. American Society For Testing and Materials, 1976, pp. 71-103.

*Primary Examiner*—R. Dean
*Assistant Examiner*—Margery S. Phipps
*Attorney, Agent, or Firm*—Finnegan, Henderson, Farabow, Garrett & Dunner

[57] ABSTRACT

A 7000 series aluminum alloy characterized by high strength, high fatigue resistance and high fracture toughness consists essentially of 5.9 to 6.9% zinc, 2.0 to 2.7% magnesium, 1.9 to 2.5% copper, 0.08 to 0.15% zirconium, a maximum of 0.15% iron, maximum of 0.12% silicon, a maximum of 0.06% titanium, a maximum of 0.04% chromium, a maximum of 0.05% for each of any other trace elements present in the alloy, the total of the other trace elements in the allow being a maximum of 0.15%, the balance of the alloy being aluminum. The foregoing alloy is hot worked to provide a wrought product, such as an extruded or plate product, in which recrystallization is held to a minimum. The wrought product is subjected to a solution treatment, quench, and elevated temperature aging cycle, normally until the product is at or near its maximum strength.

10 Claims, 3 Drawing Sheets

Fig. 1.
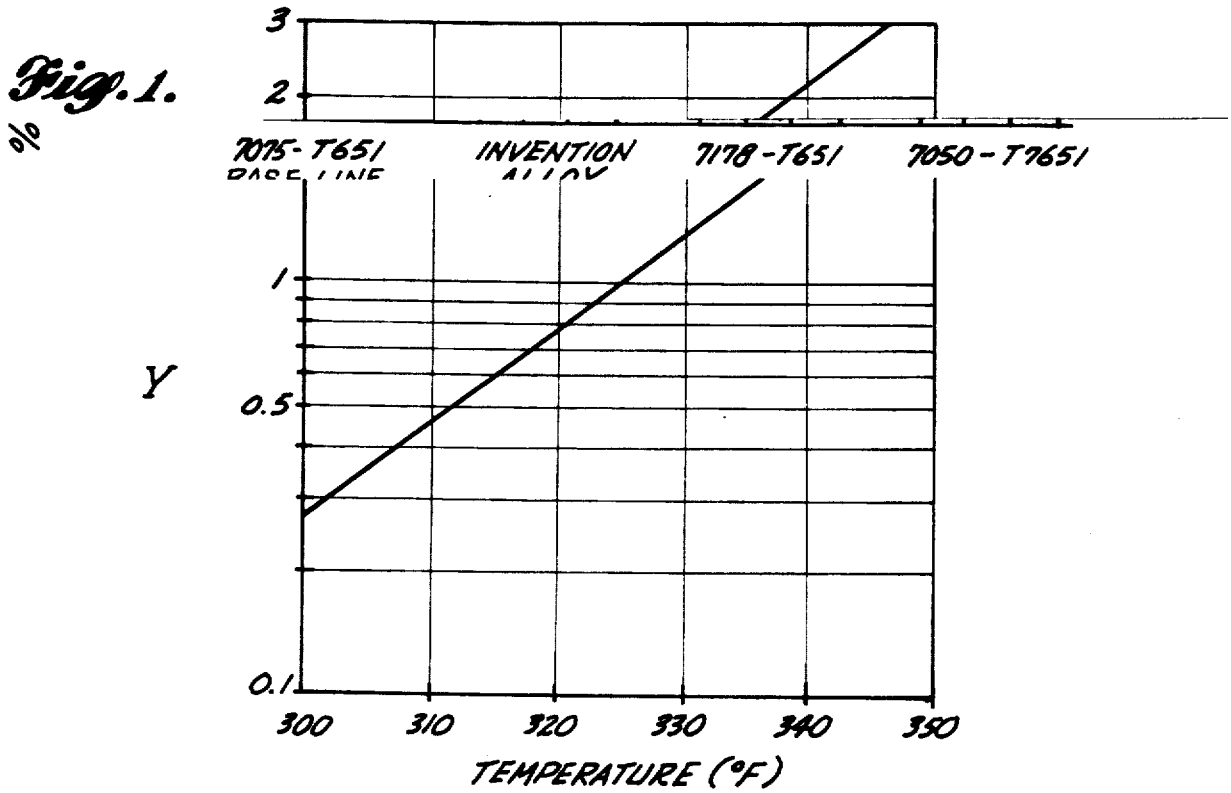
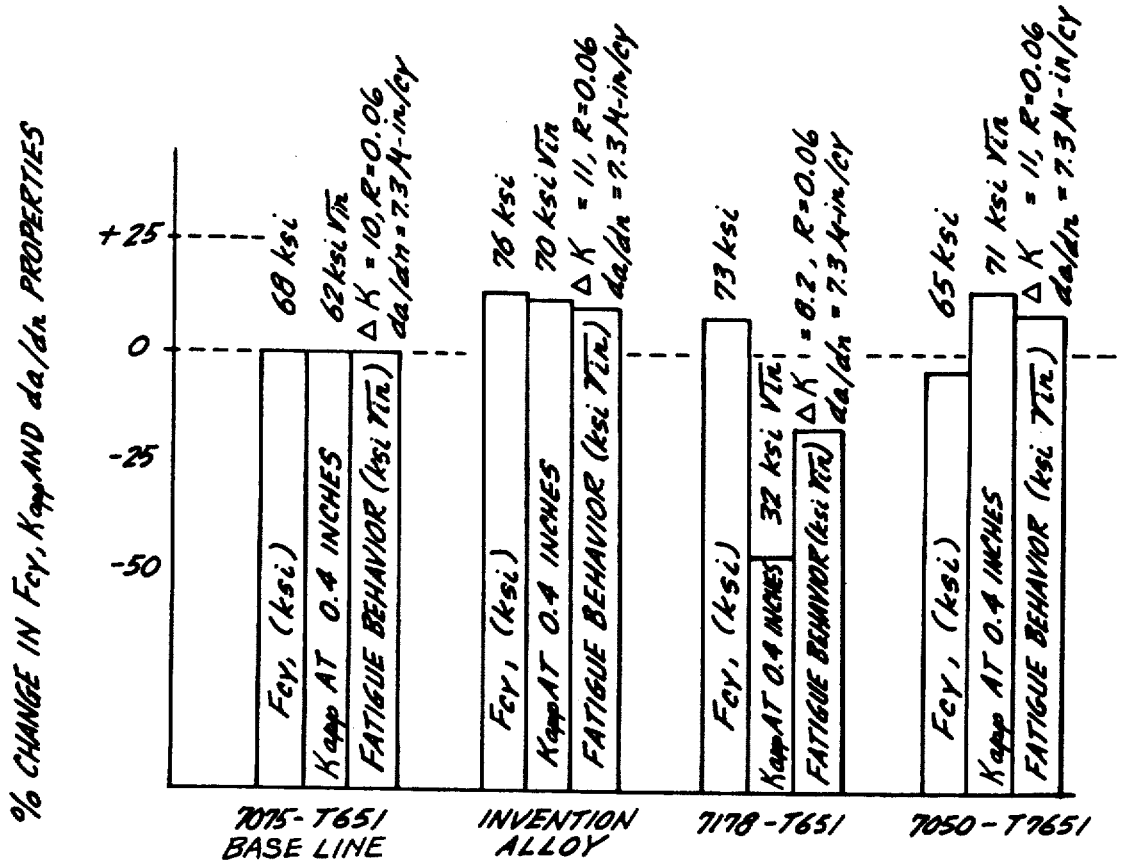
Fig. 2.

Fig. 5.
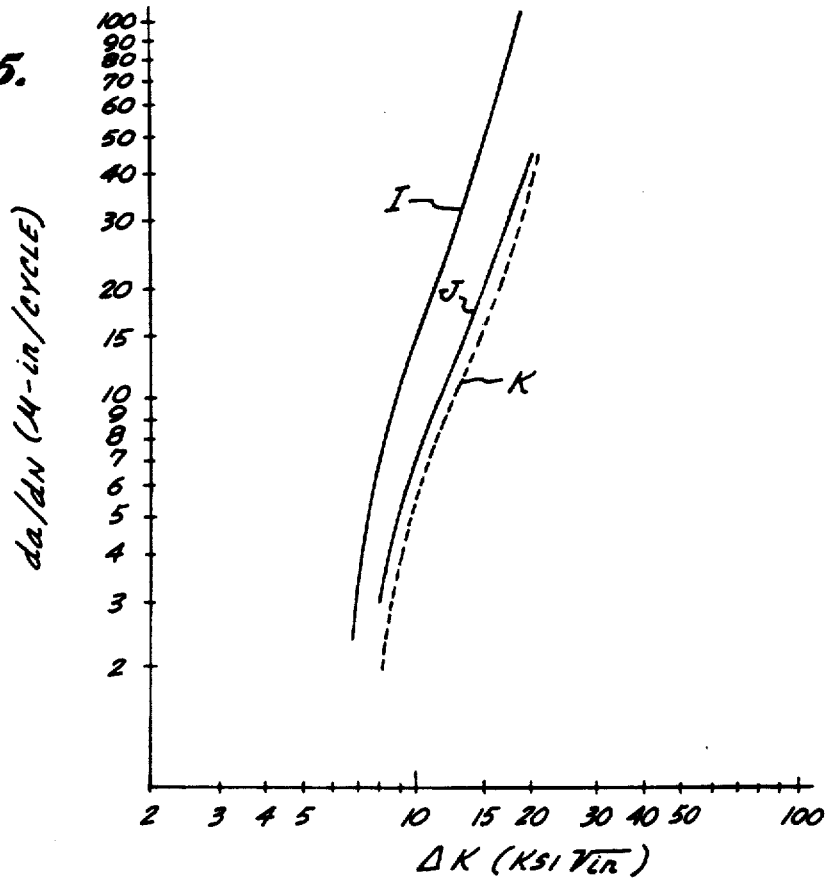
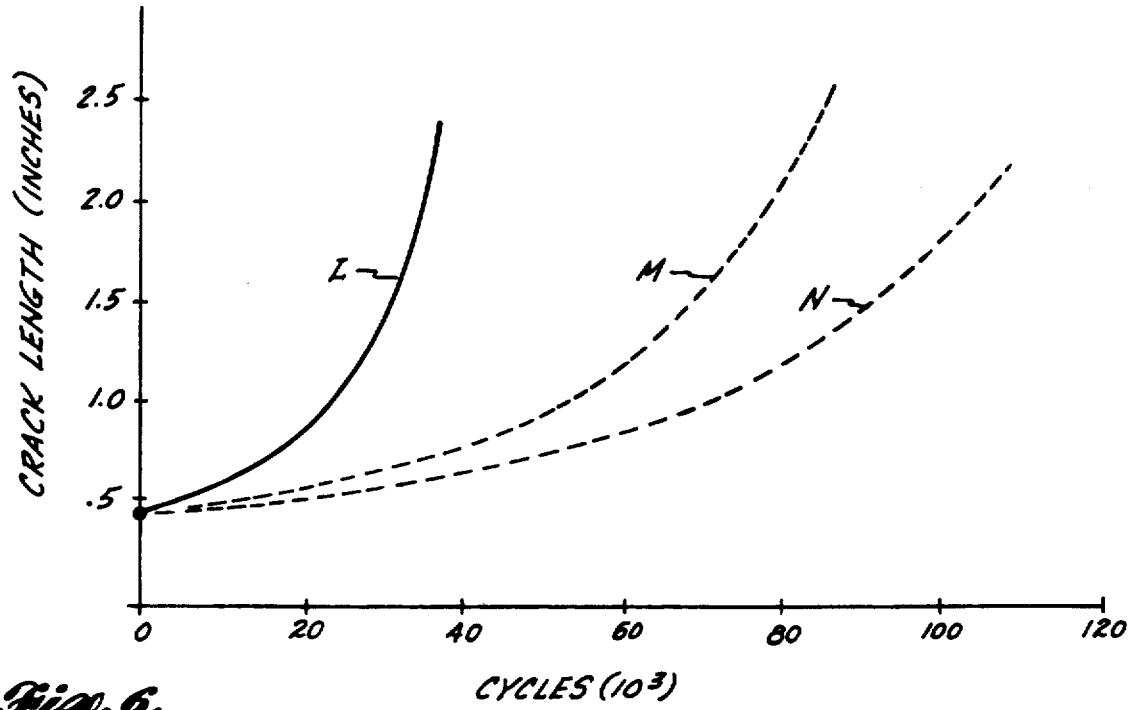
Fig. 6.

METHOD OF PRODUCING AN ALUMINUM ALLOY PRODUCT

Matter enclosed in heavy brackets [ ] appears in the original patent but forms no part of this reissue specification; matter printed in italics indicates the additions made by reissue.

BACKGROUND OF THE INVENTION

The present invention relates to aluminum alloys, and more particularly to a 7000 series alloy of the aluminum-zinc-magnesium-copper type characterized by high strength, high fatigue properties and high fracture toughness.

A significant economic factor in operating aircraft today is the cost of fuel. As a consequence, aircraft designers and manufacturers are constantly striving to improve the overall fuel efficiency. One way to increase this fuel efficiency, as well as overall performance, is to reduce structural weight. Since aluminum alloys are used in a large proportion of the structural components of most aircraft, significant efforts have been expended to develop aluminum alloys that have higher strength to weight ratios than the alloys in current use, while maintaining the same or higher fracture toughness, fatigue resistance and corrosion resistance.

For example, one alloy currently used on the upper wing skins of some commercial jet aircraft is alloy 7075 in the T651 temper. Alloy 7075-T651 has a high strength to weight ratio, while exhibiting good fracture toughness, good fatigue properties, and adequate corrosion resistance. Another currently available alloy sometimes used on commercial jet aircraft, alloy 7178-T651, is stronger than 7075-T651; however, alloy 7178-T651 is inferior to alloy 7075-T651 in fracture toughness and fatigue resistance. Thus there are more restrictions to taking advantage of the higher strength to weight ratio of alloy 7178-T651 without sacrificing fracture toughness and/or fatigue performance of the component on which it is desired to use the alloy. Other currently available alloys and tempers, although sometimes exhibiting good toughness properties and high resistance to stress-corrosion cracking and exfoliation corrosion, offer no strength advantage over alloy 7075-T651. Examples of such alloys are 7475-T651, T7651 and T7351 and 7050-T7651 and T73651. Thus, with currently available alloys and tempers, it is impossible to achieve a weight saving in aircraft structural components while maintaining fracture toughness, fatigue resistance and corrosion resistance at or above the level currently available with alloy 7075-T651.

It is therefore an object of the present invention to provide an aluminum alloy for use in structural components of aircraft that has a higher strength to weight ratio than the currently available alloy 7075-T651. It is a further object of the present invention to provide such an alloy that exhibits improved fatigue and fracture toughness properties while maintaining stress-corrosion resistance and exfoliation corrosion resistance at a level approximately equivalent to that of alloy 7075-T651.

SUMMARY OF THE INVENTION

The 7000 series alloy of the present invention fulfills the foregoing objects by providing a strength increase of from 10 to 15% over alloy 7075 in T6 tempers. Indeed, the alloy of the present invention is stronger than any other commercially available aluminum alloy. At the same time, the fracture toughness and fatigue resistance of the aluminum alloy of the present invention are higher than that achievable in alloys having strengths approaching that of the alloy of the present invention, such as 7075 and 7178 in the T6 tempers. Additionally, the corrosion resistance of the alloy of the present invention is approximately equivalent to that exhibited by alloy 7075 in the T6 tempers.

The desired combination of properties of the aluminum alloy of the present invention has been achieved in a 7000 series alloy by precisely controlling the chemical composition ranges of the alloying and trace elements, by heat treating the alloy to increase its strength to high levels, and by maintaining a substantially unrecrystallized microstructure. The alloy of the present invention consists essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, and a maximum of 0.05% for other trace elements present in the alloy, the total of the other trace elements being a maximum of 0.15%, the balance of the alloy being aluminum. Once the alloy is cast, it is hot worked to provide a wrought product, such as extrusions or plate. The product is then solution treated, quenched and subjected to an artificial aging treatment at an elevated temperature. To achieve the high strength requirements, the invention alloy is aged at elevated temperatures until it reaches its peak strength condition. The resulting product exhibits a strength increase of 10% to 15% over that exhibited by commercially available alloys such as 7075-T651 and 7050-T7651. Also, by hot working the alloy when forming the product so as to prevent any substantial recrystallization in the final product, the fracture toughness of the alloy of the present invention can be maintained at a level approximately 10% higher than that of alloy 7075-T651 and substantially above that of alloy 7178-T651.

BRIEF DESCRIPTION OF THE DRAWINGS

A better understanding of the present invention can be derived by reading the ensuing description in conjunction with the accompanying drawings wherein:

FIG. 1 is a graph of a correction factor (Y) versus aging temperature used to determine equivalent heat treatment times for the invention alloy;

FIG. 2 shows bar graphs comparing the properties of the alloy of the present invention with prior art 7000 series aluminum alloys;

FIG. 5 shows graphs of fatigue crack growth rate (da/dN) versus cyclic stress intensity factor ($\Delta K$) comparing the invention alloy with prior art 7000 series alloys; and FIG. 6 shows graphs of fatigue crack length versus stress cycles comparing the invention alloy with prior art 7000 series alloys.

DETAILED DESCRIPTION OF THE INVENTION

Figure 3:
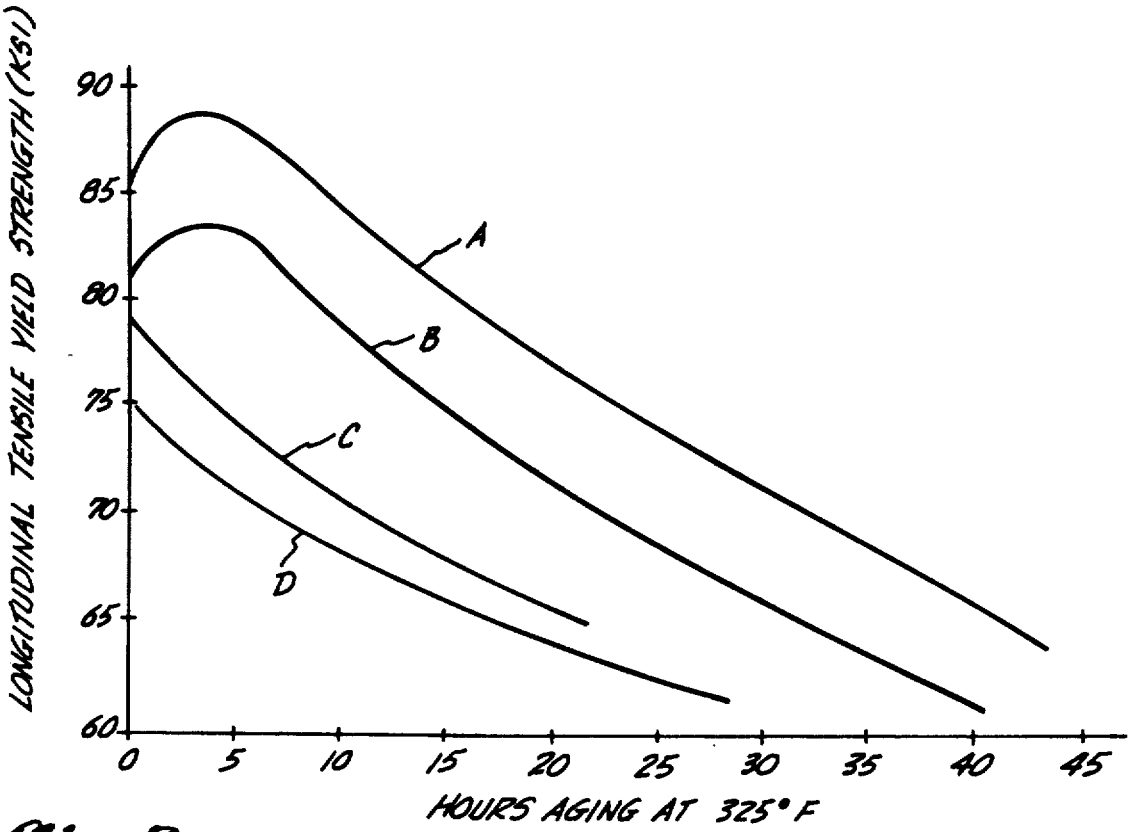
FIG. 3 shows graphs of strength versus aging time for the invention alloy and other 7000 series aluminum alloys.

The high strength, high fatigue resistance, high fracture toughness and corrosion resistance properties of the alloy of the present invention are dependent upon a chemical composition that is closely controlled within specific limits as set forth below, a carefully controlled heat treatment of products made from the alloy, and a microstructure that is substantially unrecrystallized. If the composition, fabrication, and heat treatment parameters of the invention alloy stray from the limits set forth below, the desired combination of strength increase, fracture toughness increase and fatigue improvement objectives will not be achieved.

The aluminum alloy of the present invention consists essentially of 5.9 to 6.9% zinc, 2.0 to 2.7% magnesium, 1.9 to 2.5% copper, 0.08 to 0.15% zirconium, the balance being aluminum and trace elements. Of the trace elements present, the maximum percentage of iron allowable is 0.15%, of silicon allowable is 0.12%, of manganese allowable is 0.10%, of chromium allowable is 0.04%, and of titanium allowable is 0.06%. Any other remaining trace elements have maximum limits of 0.05%, with a maximum total for the remaining trace elements being 0.15%. (The foregoing percentages are weight percentages based on the total alloy.) The most critical of the trace elements present are normally iron and silicon. If iron and silicon are present in the alloy in excess of the amounts stated above, the undesirable intermetallic compounds formed by iron and silicon during solidification, fabrication, and heat treatment will lower the fracture toughness properties of the alloy of the present invention to unacceptable levels.

The high zinc, magnesium and copper contents of the alloy of the present invention are major contributors to the high strength characteristics of the present alloy. If the zinc, magnesium and copper contents are below the limits set forth above, the strength of the alloy will fall below the strength objectives of a 10% to 15% increase over that of the base line standard, alloy 7075-T651.

Conventional melting and casting procedures are employed to formulate the alloy. Care must be taken, as pointed out above, to maintain high purity in the aluminum and the alloying constituents so that the trace elements, and especially iron and silicon, are maintained below the requisite maximums. Ingots are produced from the alloy using conventional procedures such as continuous direct chill casting. Once the ingot is formed, it can be homogenized by conventional techniques, for example, subjecting the ingot to elevated temperatures of about 900° F. for a period of time sufficient to homogenize the internal structure of the ingot and to provide an essentially uniform distribution of the alloying elements. The ingot can then be subjected to hot working procedures to produce a desired product such as plate or extrusions. When fabricating products from the alloy of the present invention, no unusual metallurgical procedures are required. However, in order to maintain the combination of mechanical and fracture properties of the alloy of the present invention, it is important to hot roll, extrude, or otherwise work produces of the alloy in a manner that avoids excessive recrystallization of the microstructure of the final product. Avoiding hot working (or cold working) practices which lead to significant amounts of recrystallization is critical, particularly for thinner plate and extrusions, for which there is an increased tendency for recrystallization to occur during solution treatment. Therefore, the product formed from an alloy of the present invention must be substantially unrecrystallized. By "substantially unrecrystallized" it is meant that less than about 50 volume percent of the alloy microstructure in a given product is in a recrystallized form, excepting surface layers which often show a much higher degree of recrystallization. (The surface layers of plate and extrusion products are usually removed during fabrication into final part configurations). Most preferably, it is desired to maintain the volume percent of recrystallized microstructure less than about 30%. Recrystallization can be minimized by maintaining the temperature during hot working at levels that cause annealing out of internal strains produced by the working operation such that recrystallization will be minimized during the working operation itself, or during subsequent solution treatment. For example, hot rolling a plate product produced from the alloy of the present invention to a thickness on the order of 1 inch at a metal temperature of about 800° F. will ordinarily prevent substantial recrystallization. Under a given set of conditions in a production rolling operation, it may be possible to roll at lower temperatures and still prevent substantial recrystallization. It has been found, for example, that the fracture toughness of an alloy having a microstructure that is greater than about 50% recrystallized deteriorates drastically, and in fact can fall considerably below the fracture toughness of prior art alloys such as 7075-T651.

After the alloy is hot worked into a product, the product is typically solution heat treated at a temperature on the order of 890° F., and preferably between 890° F. and 900° F. for a time sufficient for solution effects to approach equilibrium. Once the solution effects have approached equilibrium, the product is quenched, normally by spraying the product with, or immersing the product in, room temperature water. Thereafter the product is stretched 1% to 3% in the rolling or extrusion direction to eliminate residual quenching stresses.

It should be noted at this point that the tensile strength of the alloy of the present invention is relatively insensitive to quench rate. Thus its superior strength levels are maintained in both plate and extrusions of substantial thickness. This property of the alloy of the present invention results from the use of zirconium instead of chromium as the grain refining element. Chromium is used for most other 7000 series alloys and results in substantial decreases in strength for section thicknesses over about 3 inches, whereas the alloy of the present invention decreases only moderately in strength even when produced in section thicknesses well over 3 inches.

Although the high zinc, magnesium and copper content of the alloy of the present invention is required to obtain its superior strength characteristics, it is also necessary to artificially age the product formed from the alloy at an elevated temperature until the superior strength characteristics are achieved. In accordance with the present invention, the presently preferred method to artificially age the product produced from the alloy of the present invention is to use a two step aging procedure. The alloy is preferably first aged at an intermediate temperature on the order of 250° F. for a period of from about 4 to about 48 hours. It should be noted that the first aging step can be modified or even possibly eliminated. For example, data accumulated to date indicates that the alloy can be aged during the first stage at temperatures ranging from 225° F. to 275° F.

The second stage aging treatment is conducted at a temperature that is above the aging temperature employed during the first stage. The second stage aging is preferably conducted in the range of from 310° F. to 325° F. until the alloy reaches peak strength. By peak strength it is meant a strength at or near the maximum strength of the alloy. For example, if the second stage aging is conducted at 325° F., the aging time will range from about 3 to about 5 hours. If the second stage aging is conducted at 310° F., the aging time will range from about 6 to about 12 hours.

If desired, the second stage aging can also be conducted at temperatures in an expanded range of from 300° F. to 340° F. until peak strength is achieved. However, for temperatures at the lower end of the foregoing range, the aging time must be adjusted upwardly and for temperatures toward the upper end of the foregoing range, the aging time must be adjusted downwardly. The formula below may be used to determine the preferred second stage aging time ($t_T$) for aging temperatures other than 325° F. This formula will provide an aging time for a given temperature within the range of 300° F. to 340° F. that is equivalent to the second stage aging time for the aging temperature of 325° F. as set forth in the preceding paragraph. The formula is:

$$t_T = \frac{t_{325}}{Y},$$

wherein $t_T$ is the time for which the product of the present invention is aged during the second stage aging at a temperature T other than 325° F. to achieve peak strength, wherein $t_{325}$ can range from about 3 to about 5 hours for various products as set forth in the preceding paragraph, and wherein Y is a factor for converting the 325° F. aging time ($t_{325}$) to the aging time $t_T$ at the temperature T.

The factor Y is derived from the graph of FIG. 1 which is a log-linear graph of the Y factor versus aging temperature. For example, if it were desired to conduct the second stage aging at a temperature of 312° F., the factor Y would be about 0.5; and if it were desired to age at a temperature of 338° F., the factor Y would be about 2. It should also be realized that the aging time ($t_T$) calculated from the above formula can be varied up to about 3 hours and still achieve the peak strength properties in accordance with the present invention. For example, for second stage aging temperatures near the upper limit of the expanded range, the variation from $t_T$ is preferably no more than about ±½ hour; however, at the lower end of the expanded range, $t_T$ can be varied up to about ±3 hours.

EXAMPLES

The following Examples are intended to be illustrative of the present invention and are intended to teach one of ordinary skill how to make and use the invention. They are not intended in any way to delimit or otherwise narrow the scope of protection afforded by the grant of Letters Patent hereon.

EXAMPLE I

More than fifty ingots of the alloy of the present invention were formulated in accordance with conventional procedures. These ingots had a nominal composition of 6.4% zinc, 2.35% magnesium, 2.2% copper, 0.11% zirconium, 0.07% iron, 0.05% silicon, <0.01% manganese, 0.01% chromium, 0.02% titanium, and a total of <0.03% of other trace elements, the balance of the alloy being aluminum. The ingots were rectangular in shape and had thicknesses between sixteen and twenty-four inches. The ingots were scalped, homogenized at about 880° F., and hot rolled to plate thicknesses varying from 0.375 to about 1.5 inches. These plates were then solution heat treated at about 890° F. for 1 to 2 hours, depending on thickness, and spray quenched in room temperature water. The plates were then stretched 1½ to 3% in the rolling direction to eliminate residual quenching stresses and were artificially aged for 24 hours at 250° F., followed by a second stage aging at about 310° F. for about 11 to 12 hours. Compression yield strength, fracture toughness and fatigue crack growth rate tests were then run on specimens taken from the plate products. The data from these tests were analyzed to provide minimum and mean values for each of the tests.

Similar data from conventional commercially available 7075-T651 alloy, 7178-T651 alloy and 7050-T7651 alloy plate were also analyzed for comparison. The 7075 alloy had a nominal composition of 5.6% zinc, 2.5% magnesium, 1.6% copper, 0.2% chromium, 0.05% manganese, 0.2% iron and 0.15% silicon, the balance of the alloy being aluminum and small amounts of other extraneous elements. The 7178 alloy had a nominal composition of 6.8% zinc, 2.7% magnesium, 2.0% copper, 0.2% chromium, 0.05% manganese, 0.2% iron and 0.15% silicon, the balance of the alloy being aluminum and small amounts of other extraneous elements. The 7050 alloy had a nominal composition of 6.2% zinc, 2.25% magnesium, 2.3% copper, 0.12% zirconium, 0.09% iron, 0.07% silicon, 0.01% chromium, 0.02% titanium, the balance of the alloy being aluminum and small amounts of other extraneous elements.

Compression yield strength ($F_{cy}$) tests were run in a conventional manner. The fracture toughness tests were also run in a conventional manner at room temperature using center cracked panels, with the data being represented in terms of the apparent critical stress intensity factor $K_{app}$ at panel fracture. The fracture toughness parameter ($K_{app}$) is related to the stress required to fracture a flat panel containing a crack oriented normal to the stressing direction and is determined from the following formula:

$$K_{app} = \sigma_g \sqrt{\pi a_0}\ \alpha$$

wherein $\sigma_g$ is the gross stress required to fracture the panel;

$a_o$ is one-half the initial crack length for a center cracked panel, and $\alpha$ is a finite width correction factor (for the panels tested, $\alpha$ was slightly greater than 1).

For the present tests, 16 inch wide to 20 inch wide panels containing center cracks approximately one-third the panel width were used to obtain the $K_{app}$ values.

The data for the fatigue crack growth rate comparisons were taken from data developed from precracked, single edge notched panels. The panels were cylically stressed in laboratory air in a direction normal to the orientation of the fatigue crack. The minimum to maximum stress ratio (R) for these tests was 0.06. Fatigue crack growth rates (da/dN) were determined as a function of the cyclic stress intensity parameter ($\Delta K$) applied to the precracked specimens. The parameter $\Delta K$ (ksi$\sqrt{\text{in}}$) is a function of the cyclic fatigue stress ($\Delta\sigma$)

applied to the panel, the stress ratio (R), the crack length and the panel dimensions. Fatigue comparisons were made by noting the cyclic stress intensity ($\Delta K$) required to propagate the fatigue crack at a rate of 7.3 microinches/cycle for each of the alloys.

The results of the strength, fracture toughness and fatigue crack growth rate tests are set forth in the bar graphs of FIG. 2 as percentage changes from the base line alloy 7075-T651, which was chosen for comparison as it is currently used for many aircraft applications including upper wing surfaces. The values for the minimum compression yield strength (99% of the test specimens meet or exceed the value shown with a 95% confidence level), and the average $K_{app}$ are set forth at the top of the appropriate bar in FIG. 2. Fatigue crack growth rate behavior is expressed as a percentage difference between the average cyclic stress intensity ($\Delta K$) required for a crack growth rate of 7.3 microinches/cycle for a given alloy and the $\Delta K$ required for a crack growth rate of 7.3 microinches/cycle in 7075-T651. As can be seen from FIG. 2, the $\Delta K$ level required to provide a crack growth rate of 7.3 microinches/cycle for the 7075-T651 alloy was about 10 ksi$\sqrt{\text{in.}}$; for the alloy of the present invention, 11 ksi$\sqrt{\text{in.}}$; for the 7178 alloy 8.2 ksi$\sqrt{\text{in.}}$; and for the 7050 alloy, 11 ksi$\sqrt{\text{in.}}$ The bar graphs in FIG. 2 show that the alloy of the present invention has strength, fracture toughness and fatigue properties that are 10 to 15% better than the 7075-T651 base line alloy. As can be seen, the 7050-T7651 alloy has fracture toughness and fatigue properties similar to that of the invention alloy, however, the compression yield strength of the 7050-T7651 alloy is not only below that of the alloy of the present invention but is also slightly below that of the base line alloy 7075-T651. As is readily observed, the fracture toughness and fatigue crack growth rate properties of the invention alloy are substantially improved over those of the 7178-T651 alloy. Thus it is observed that only by staying within the compositional limits of the alloy of the present invention, by carefully hot working the alloy of the present invention to prevent substantial recrystallization, and by aging the alloy of the present invention to its peak strength can all three of the strength, fracture toughness and fatigue properties be improved over that of the base line alloy 7075-T651. Although not noted in the above comparisons or in the data of FIG. 2, it should also be emphasized that comparisons for extruded products show similar relative improvements for the invention alloy over prior art alloys.

EXAMPLE II

The procedures of Example I were employed to produce a plate and extrusion product from typical ingots of the alloy of the present invention. After initially artificially aging the products for about 24 hours at about 250° F., the products produced from the alloy of the present invention were subjected to a second stage aging step at 325° F. for varying amounts of time ranging from 0 to 24 hours. The alloys had the same nominal composition as the alloys of the present invention shown in Example I. Specimens taken from the products were then tested for longitudinal yield strength using conventional procedures. The resulting typical yield strengths versus aging time are plotted in graphs A and B of FIG. 3. Graph A indicates the strength values obtained from the extruded product and graph B indicates the strength values obtained from the plate product. Additionally, typical yield strengths from plate products of conventional 7178-T651 and 7075-T651 alloys subjected to a second stage aging at 325° F. for various times ranging from 0 to 24 hours are shown. The strength values for the 7178 plate were shown in graph C, and the strength values for the 7075 plate are shown in graph D of FIG. 3.

It will be noted from FIG. 3 that the invention alloy achieves and maintains peak strength after additional aging at 325° F. for about 3 to 5 hours. To the contrary, as the 7075 and 7178 plates are exposed to the 325° F. second stage aging treatment, their strength immediately begins to decrease. It is also observed that when the alloy of the present invention is overaged significantly, on the order of 15 to 25 hours, its strength falls below its peak or maximum strength. At these significantly overaged tempers, however, the alloy of the present invention shows significant improvements in short transverse stress-corrosion resistance and exfoliation corrosion resistance.

EXAMPLE III

Figure 4:
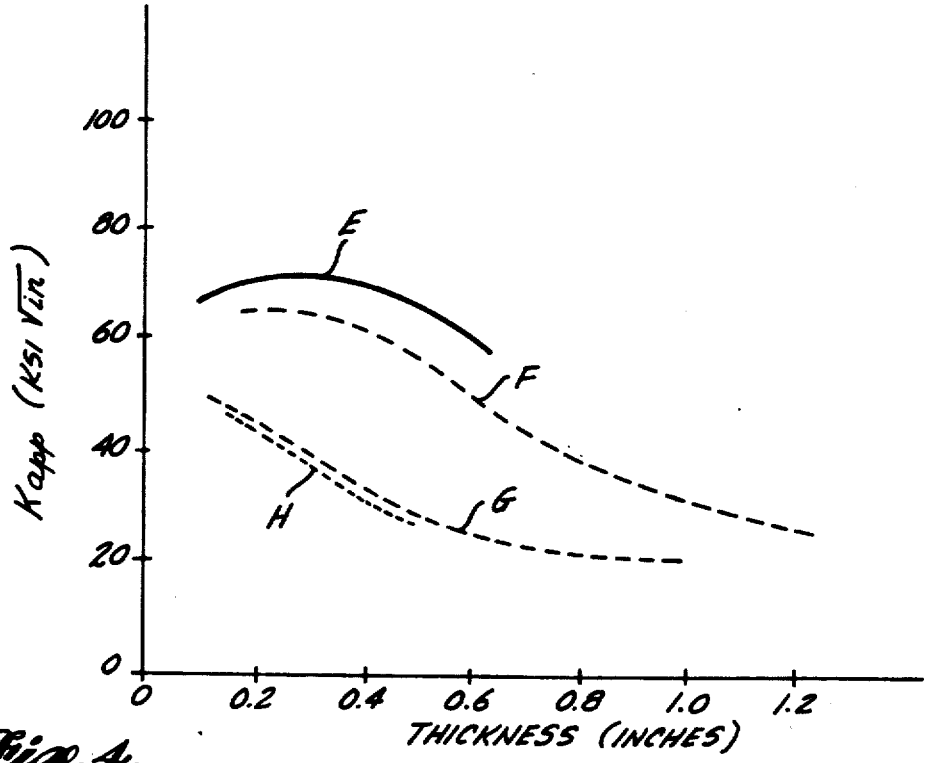
FIG. 4 shows graphs of the fracture toughness parameter ($K_{app}$) versus thickness comparing the invention alloy with prior art 7000 series aluminum alloys.

Conventional fracture toughness tests were conducted on center cracked test panels from the alloy of the present invention produced in accordance with the procedure set forth in Example I, and also from alloys 7075-T651 and 7178-T651. The test panels had varying thicknesses and were machined from 0.5 inch and 1.0 inch thick plate produced from the alloys. The nominal composition of the alloy of the present invention, and of 7075 and 7178, were the same as those shown in Example I. The fracture toughness data ($K_{app}$) from several tests at room temperature were averaged and are plotted versus panel thickness in FIG. 4. The fracture toughness for the product produced from the alloy of the present invention is shown by graph E of FIG. 4, the fracture toughness for the 7075-T651 alloy by graph F, and the fracture toughness of the 7178-T651 alloy of graph C. As will be observed, the alloy of the present invention exhibits better fracture toughness than alloy 7075-T651 and much improved toughness compared to alloy 7178-T651.

Additionally, an alloy having the composition of the alloy of the present invention were formed into plate products of varying thickness in accordance with the procedure set forth in Example I, with the exception that the hot working temperatures were not sufficiently high to prevent excessive recrystallization in the plate products. It was determined that approximately 75 volume percent of the alloy was recrystallized. The room temperature fracture toughness data for these substantially recrystallized plates of the alloy are plotted versus plate thickness in graph H of FIG. 4. As will be observed, the fracture toughness properties of the invention alloy, when substantially recrystallized, fall to approximately the levels of the 7178-T651 alloy. As a consequence, it is important that the alloy of the present invention be hot worked in a manner that will prevent substantial recrystallization. The volume percent recrystallized was determined for this Example by the point count method on photomicrographs (100× magnification) of a full thickness sample. For purposes of comparison, the alloy of the present invention for which fracture toughness data is presented in graph E of FIG. 4 was only about 17% recrystallized, while the alloy for which fracture toughness data is presented in graph H was about 75% recrystallized. From this, it is apparent that an alloy of the present invention must be substantially unrecrystallized in order to provide fracture toughness properties that are better than the prior art alloys.

EXAMPLE IV

The fatigue crack growth rate (da/dN) properties of the alloy of the present invention are improved over other commercial alloys having similar strength characteristics, namely the 7075-T651 and 7178-T651 alloys. Four production lots of plate material of the alloy of the present invention were prepared in accordance with the general procedure set forth in Example I. In addition, nine production lots of 7075-T651 alloy plate and two production lots of 7178-T651 alloy plate were procured. Using the general procedures outlined in Example I, fatigue crack growth rate tests were conducted on precracked single edge notched panels produced from the production lots on each of the alloys. For the alloy of the present invention, eight da/dN tests were run; for the 7075-T651 alloy, nine da/dN tests were run; and for the 7178-T651 alloy, eight da/dN tests were run. The da/dN values for the various alloys were then averaged and plotted. FIG. 5 is a plot of the mean values of the crack growth rates (da/dN) in microinches per cycle versus the cyclic stress intensity parameter ($\Delta K$) for each of the alloys. Curve I represents the crack growth rates for 7178-T651 alloy, curve J for 7075-T651 alloy, and curve K for the alloy of the present invention. As is readily observed from the graphs of FIG. 5, the alloy of the present invention has superior fatigue crack growth rate properties at each stress intensity level examined when compared with the 7178-T651 and 7075-T651 alloys.

The data from FIG. 5 were utilized to plot the graphs of FIG. 6 wherein crack length is plotted versus the number of stress cycles, wherein the maximum stress applied was selected to be 10,000 psi and wherein the minimum to maximum stress ratio (R) was equal to 0.06. The initial crack length in the panels was selected to be 0.45 inches. Curve L is the graph of the data for the 7178-T651 alloy, curve M for the 7075-T651 alloy and curve N for the alloy of the present invention. Again, the graphs of FIG. 6 clearly illustrate that the alloy of the present invention outperforms alloys 7178-T651 and 7075-T651 in crack growth rate properties by substantial margins.

As can be readily observed by reference to the foregoing Examples, the alloy of the present invention has a superior combination of strength, fracture toughness and fatigue resistance when compared to the prior art alloys typified by 7075-T651, 7178-T651 and 7050-T7651. Other tests conducted on the alloy of the present invention and comparable 7075-T651 and 7178-T651 alloys also indicate that the stress corrosion resistance and exfoliation corrosion resistance of the alloy of the present invention are approximately equivalent to the corrosion resistance properties of alloy 7075-T651, and thus can be employed for the same applications, such as wing panels and the like.

Accordingly, one of ordinary skill, after reading the foregoing specification, will be able to effect various changes, substitutions of equivalents and other alterations to the compositions and procedures set forth without varying from the general concepts disclosed. It is therefore intended that a grant of Letters Patent hereon be limited only by the definition contained in the appended claims and equivalents thereof.

The embodiments of the invention in which an exclusive property or privilege is claimed are defined as follows:

1. [A method of producing] *An upper wing skin of a commercial jet aircraft comprising* an improved alloy product *having high strength, high fracture toughness and high fatigue resistance made in accordance with the process* comprising the steps of:

(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy, (b) working said body *to a thickness of less than about 1.5 inches* to provide a wrought product, said [alloy] *body* being hot worked [so as to prevent substantial recrystallization of said alloy] *by rolling at a temperature that is intentionally maintained sufficiently high so that less than about 50 volume % of said alloy is recrystallized product,*

(c) subjecting said product to solution treatment and quenching, *and*

(d) subjecting said product to an artificial aging treatment at an elevated temperature *wherein said artificial aging treatment is continued only until said alloy reaches its peak strength.*

2. [The method of claim 1] *An upper wing skin of a commercial jet aircraft comprising an improved alloy product having high strength, high fracture toughness and high fatigue resistance made in accordance with the process comprising the steps of:*

*(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy,*

*(b) working said body to a thickness of less than about 1.5 inches to provide a wrought product, said body being hot worked by rolling at a temperature that is intentionally maintained sufficiently high so that less than about 30 volume % of said alloy is recrystallized product,*

*(c) subjecting said product to solution treatment and quenching, and*

*(d) subjecting said product to an artificial aging treatment at an elevated temperature* wherein said artificial aging treatment is continued only until said alloy reaches its peak strength.

3. [The method of claim 1] *An upper wing skin of a commercial jet aircraft comprising an improved alloy product having high strength, high fracture toughness and high fatigue resistance made in accordance with the process comprising the steps of:*

*(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum*

*of 0.04% chromium, a maximum of 0.05% for each of any other trace elements present in the alloy, the maximum total of said other trace elements being 0.15%, the balance being aluminum, all percentages herein by weight based on the total alloy,*

(*b*) *working said body to a thickness of less than about 1.5 inches to provide a wrought product, said body being hot worked by rolling at a temperature that is intentionally maintained sufficiently high so that less than about 50 volume % of said alloy is recrystallized product,*

(*c*) *subjecting said product to solution treatment and quenching, and*

(*d*) *subjecting said product to an artificial aging treatment at an elevated temperature* wherein said artificial aging treatment comprises:

first aging said product at an intermediate temperature above room temperature and below said elevated temperature, and thereafter aging said product at said elevated temperature until said alloy reaches it peak strength.

4. [The method of claim 3] *An upper wing skin of a commercial jet aircraft comprising an improved alloy product having high strength, high fracture toughness and high fatigue resistance made in accordance with the process comprising the steps of:*

(*a*) *providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy,*

(*b*) *working said body to a thickness of less than about 1.5 inches to provide a wrought product, said body being hot worked by rolling at a temperature that is intentionally maintained sufficiently high so that less than about 50 volume % of said alloy is recrystallized product,*

(*c*) *subjecting said product to solution treatment and quenching, and*

(*d*) *subjecting said project to an artificial aging treatment at an elevated temperature wherein said artificial aging treatment comprises:*

*first aging said product at an intermediate temperature above room temperature and below said elevated temperature, and*

*thereafter aging said product at said elevated temperature until said alloy reaches its peak strength* wherein the second aging step comprises:

aging said product at said elevated temperature T of from 300° F. to 340° F. for about the period of time ($t_T$) indicated by the following formula:

$$t_T = \frac{t_{325}}{Y}$$

wherein Y is a factor read from the graph of FIG. 1 for a desired aging temperature T, wherein $t_{325}$ can range from about 3 to 5 hours, and wherein $t_T$ can be varied up to about ±3 hours from the value calculated by the formula.

5. The method of claim 1] *An upper wing skin of a commercial jet aircraft comprising an improved alloy product having high strength, high fracture toughness and high fatigue resistance made in accordance with the process comprising the steps of:*

(*a*) *providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy,*

(*b*) *working said body to a thickness of less than about 1.5 inches to provide a wrought product, said body being hot worked by rolling at a temperature that is intentionally maintained sufficiently high so that less than about 50 volume % of said alloy is recrystallized product,*

(*c*) *subjecting said product to solution treatment and quenching, and*

(*d*) *subjecting said product to an artificial aging treatment at an elevated temperature* wherein said artificial aging step comprises:

initially aging said product for a period of from 4 to 48 hours at a temperature of from 225° F. to 275° F., and thereafter aging said product for a period of from 3 to 12 hours at an elevated temperature of from 310° F. to 325° F.

[6. The method of claims 1, 2, 3, 4 or 5 wherein said alloy is hot worked at a temperature sufficiently high so that less than about 50% of said alloy is recrystallized.]

[7. The method of claims 1, 2, 3, 4 or 5 wherein said alloy is hot worked at a temperature sufficiently high so that less than about 30% of said alloy is recrystallized.]

[8. The method of claim 1 wherein said artificial aging treatment is continued after said alloy reaches peak strength to enhance the corrosion resistance properties of said alloy.]

[9. The product produced by the method of claim 1.]

[10. The product produced by the method of claim 2.]

[11. The product produced by the method of claim 3.]

[12. The product produced by the method of claim 4.]

[13. The product produced by the method of claim 5.]

[14. The product produced by the method of claim 6.]

[15. The product produced by the method of claim 7.]

[16. The product produced by the method of claim 8.]

17. *An upper wing skin of a commercial jet aircraft comprising an improved alloy product having high strength, high fracture toughness and high fatigue resistance made in accordance with the process comprising the steps of:*

(*a*) *providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the* maximum total of said other trace elements being 0.15%, the balance being aluminum, all percentages herein by weight based on the total alloy, (b) working said body to a thickness of less than about 1.5 inches to provide a wrought product, said body being hot worked by rolling at a temperature that is intentionally maintained sufficiently high so that less than about 50 volume % of said alloy is recrystallized product, (c) subjecting said product to solution treatment and quenching, and (d) subjecting said product to an artificial aging treatment at an elevated temperature, to thereby produce a product having a minimum compression yield strength of 76 ksi, an average fracture toughness of 70 ksi$\sqrt{\text{in.}}$, and a fatigue crack growth rate of 7.3 microinches per cycle at an average cyclic stress intensity $\Delta K$ of 11 ksi$\sqrt{\text{in.}}$ at $R=0.06$.

18. An upper wing skin of a commercial jet aircraft comprising an improved alloy product having high strength, high fracture toughness and high fatigue resistance made in accordance with the process comprising the steps of:

(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy, (b) working said body to a thickness of less than about 1.5 inches to provide a wrought product, said body being hot worked by rolling at a temperature that is intentionally maintained sufficiently high so that less than about 30 volume % of said alloy is recrystallized product, (c) subjecting said product to solution treatment and quenching, and (d) subjecting said product to an artificial aging treatment at an elevated temperature.

19. An upper wing skin of a commercial jet aircraft comprising an improved alloy product having high strength, high fracture toughness and high fatigue resistance made in accordance with the process comprising the steps of:

(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy, (b) working said body to a thickness of less than about 1.5 inches to provide a wrought product, said body being hot worked by rolling at a temperature that is intentionally maintained sufficiently high so that less than about 30 volume % of said alloy is recrystallized product, (c) subjecting said product to solution treatment and quenching, and (d) subjecting said product to an artificial aging treatment at an elevated temperature wherein said artificial aging treatment comprises:

first aging said product at an intermediate temperature above room temperature and below said elevated temperature, and thereafter aging said product at said elevated temperature until said alloy reaches its peak strength.

20. An upper wing skin of a commercial jet aircraft comprising an improved alloy product having high strength, high fracture toughness and high fatigue resistance made in accordance with the process comprising the steps of:

(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy, (b) working said body to a thickness of less than about 1.5 inches to provide a wrought product, said body being hot worked by rolling at a temperature that is intentionally maintained sufficiently high so that less than about 30 volume % of said alloy is recrystallized product, (c) subjecting said product to solution treatment and quenching, and (d) subjecting said product to an artificial aging treatment at an elevated temperature wherein said artificial aging treatment comprises:

first aging said product at an intermediate temperature above room temperature and below said elevated temperature, and thereafter aging said product at said elevated temperature until said alloy reaches its peak strength wherein the second aging step comprises:

aging said product at said elevated temperature T of from 300° F. to 340° F. for about the period of time ($t_T$) indicated by the following formula:

$$t_T = \frac{t_{325}}{Y}$$

wherein Y is a factor read from the graph of FIG. 1 for a desired aging temperature T, wherein $t_{325}$ can range from about 3 to 5 hours, and wherein $t_T$ can be varied up to about ±3 hours from the value calculated by the formula.

21. An upper wing skin of a commercial jet aircraft comprising an improved alloy product having high strength, high fracture toughness and high fatigue resistance made in accordance with the process comprising the steps of:

(a) providing a body composed of an alloy consisting essentially of 5.9 to 6.9% zinc, 2.0 to 2.7% magnesium, 1.9 to 2.5% copper, 0.08 to 0.15% zirconium, a maximum of 0.15% iron, a maximum of 0.12% silicon, a maximum of 0.06% titanium, a maximum of 0.04% chromium, a maximum of 0.05% for each of any other trace elements present in the alloy, the maximum total of said other trace elements being 0.15%, the balance being aluminum, all percentages herein by weight based on the total alloy,

*(b) working said body to a thickness of less than about 1.5 inches to provide a wrought product, said body being hot worked by rolling at a temperature that is intentionally maintained sufficiently high so that less than about 30 volume % of said alloy is recrystallized product,*

*(c) subjecting said product to solution treatment and quenching, and*

*(d) subjecting said product to an artificial aging treatment at an elevated temperature wherein said artificial aging step comprises:*

*initially aging said product for a period of from 4 to 48 hours at a temperature of from 225° F. to 275° F., and*

*thereafter aging said product for a period of from 3 to 12 hours at an elevated temperature of from 310° F. to 325° F.*

* * * * *